(12) United States Patent
Abel et al.

(10) Patent No.: US 8,854,688 B2
(45) Date of Patent: Oct. 7, 2014

(54) RASTER IMAGE PROCESSOR CONFIGURATION DETERMINATION BASED ON PER PAGE COLOR DETERMINATION

(75) Inventors: Donald Abel, Sherwood, OR (US); Tasha T. Zahnd, Vancouver, WA (US); Richard L. Hilton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 172 days.

(21) Appl. No.: 13/530,268

(22) Filed: Jun. 22, 2012

(65) Prior Publication Data
US 2013/0342858 A1   Dec. 26, 2013

(51) Int. Cl.
*G06F 15/00*   (2006.01)
*H04N 1/60*   (2006.01)

(52) U.S. Cl.
USPC ............ 358/1.9; 358/1.2; 358/518; 358/1.15; 358/2.1

(58) Field of Classification Search
None
See application file for complete search history.

(56) References Cited

U.S. PATENT DOCUMENTS

| | | | |
|---|---|---|---|
| 6,934,047 B2 | 8/2005 | Housel | |
| 2002/0105672 A1* | 8/2002 | Housel | 358/1.15 |
| 2003/0043414 A1* | 3/2003 | Brady | 358/3.06 |
| 2004/0080765 A1* | 4/2004 | Nishide et al. | 358/1.9 |
| 2004/0158655 A1 | 8/2004 | Kremer | |
| 2005/0219661 A1* | 10/2005 | Hirabayashi | 358/518 |
| 2007/0229883 A1* | 10/2007 | Fujimori et al. | 358/1.15 |
| 2008/0228667 A1* | 9/2008 | Beabes et al. | 705/400 |
| 2010/0231933 A1 | 9/2010 | Morales et al. | |
| 2010/0328684 A1* | 12/2010 | Cain | 358/1.2 |
| 2011/0242562 A1* | 10/2011 | Vrhel | 358/1.9 |
| 2012/0109957 A1 | 5/2012 | Vandervort | |

OTHER PUBLICATIONS

Helios, "What Does DeviceN Mean for Prepress Customers?" Helios drupa Info 2012, 5.p. [Online] http://www.helios.de/viewart.html?id=947-en.

* cited by examiner

*Primary Examiner* — Kimberly A Williams

(57) ABSTRACT

A system comprising a host processor and a raster image processor (RIP). The host processor is to determine whether each page in a multi-page document contains color, partition a print job into a plurality of print sub-jobs, and determine a separate configuration for the RIP for each print sub-job.

18 Claims, 4 Drawing Sheets

RASTER IMAGE PROCESSOR CONFIGURATION DETERMINATION BASED ON PER PAGE COLOR DETERMINATION

BACKGROUND

Many printing systems permit documents to be printed in black ink only or color. Some content (e.g., documents) have both black and color (non-black). For example, some pages of a document may be printed with black ink only, while other pages have portions that are printed with one or more colors. Black ink is referred to by the designation K. Colored ink may include one or more of cyan, magenta, and yellow ("CMY"). Some printing systems are capable of CMYK printing which uses four inks—cyan, magenta, yellow, and black. Additional color ink may be used as well. Black and shades of gray can be simulated with combinations of cyan, magenta, and yellow. Thus, black ink is not necessary, but quality may suffer somewhat when simulating black or gray with CMY rather than using black ink. However, CMY-based printing is faster than CMYK printing.

BRIEF DESCRIPTION OF THE DRAWINGS

For a detailed description of various implementations, reference will now be made to the accompanying drawings in which.

DETAILED DESCRIPTION

Unless otherwise stated, the term "color" and "color ink" refers to colors other than black ink. In one example, color ink includes cyan, magenta, and yellow ink, but can include additional or different colors as well. The term "document" includes content in any form such as a file, a database, streamed content, etc.

Print presses use a raster image processor (RIP) to rasterize a document for subsequent printing by the print press. The RIP is configured differently when printing with black ink only versus when printing with color ink. A user manually identifies which pages are to be printed with black ink only and which pages are to be printed with color ink. The user manually provides this information (via, for example, a graphical user interface or file) and the RIP is configured accordingly during the printing process.

The implementations described herein avoid the need for the user to manually determine and provide the per page ink type information. Instead, in the disclosed examples a processing device analyze a document to be printed to automatically determine the pages that contain color and the pages that do not contain color. The print job then is partitioned into at least one print sub-job that contains color and at least one other print sub-job that does not contain color. Further, the print job may be partitioned into multiple color-based print sub-jobs and/or multiple print sub-jobs that do not contain color. Separate configurations are determined for the RIP for each such print sub-job and the various print sub-jobs are then processed by the RIP with the resulting separations aggregated together into a unified print job for submission to the printing device (e.g., print press). The system automatically thus determines which pages contain color and thereby avoids the burden and hassle to the user.

Figure 1:
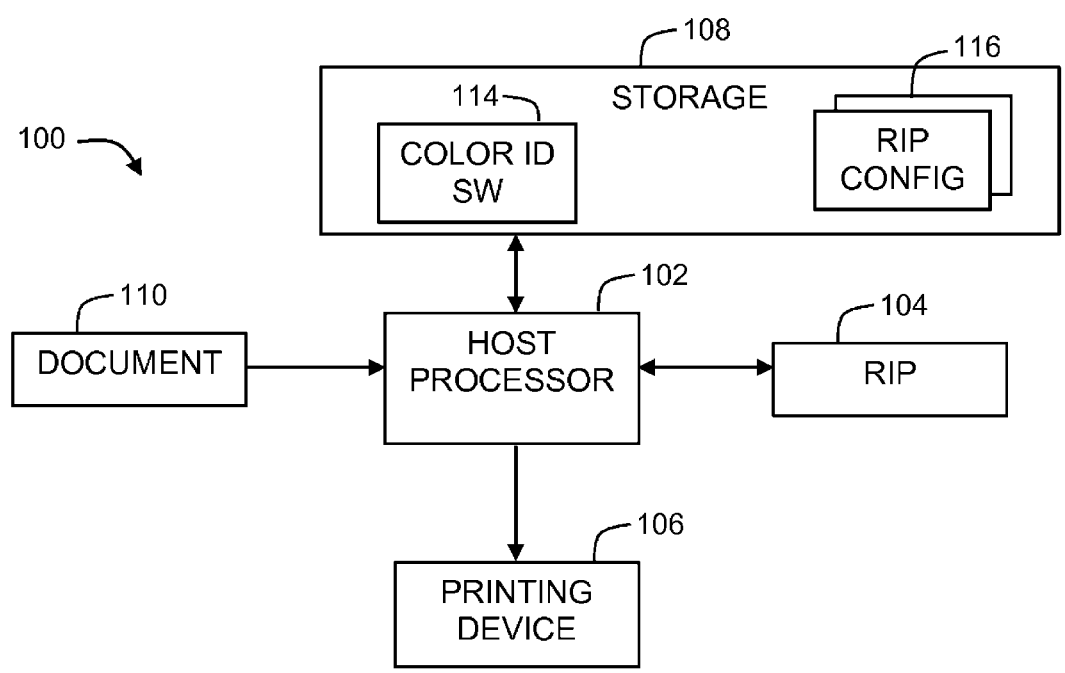
FIG. 1 shows a system in accordance with various implementations.

FIG. 1 shows an illustrative system 100 including a host processor 102 accessible to (e.g., coupled to) a RIP 104 as well as to a storage device 108 and a printing device 106. A document 110 is processed and printed by the system 100. The host processor 102 may execute color identification (ID) software 114 stored on the storage device 108. The host processor 102 performs some or all of the functionality described herein. The RIP 104 also is implemented as a hardware processor. The hardware processor that implements the RIP 104 may be separate from the host processor 102 or may be the host processor itself. In this latter example, the RIP 104 is implemented as software executing on the host processor 102. Thus, a processor may function as both the host processor and the RIP.

The storage device 108 may comprise volatile memory (e.g., random access memory), non-volatile storage (e.g., hard disk drive, solid-state storage, optical disk, etc.), or combinations of both. As noted above, the storage device 108 includes the software 114 executed by the host processor 102. The storage device 108 also may be used to store data.

The printing device 106 may be any suitable type of printing device. In one example, the printing device 106 includes a digital print press. As a digital print press, the printing device 106 includes multiple types of fluid (e.g., toner) such as cyan, magenta, yellow, and black ink. The printing device may be a liquid electro-photographic (LEP) printing device such as that illustrated in FIG. 2, or another type of printer such as an inkjet printer.

Figure 2:
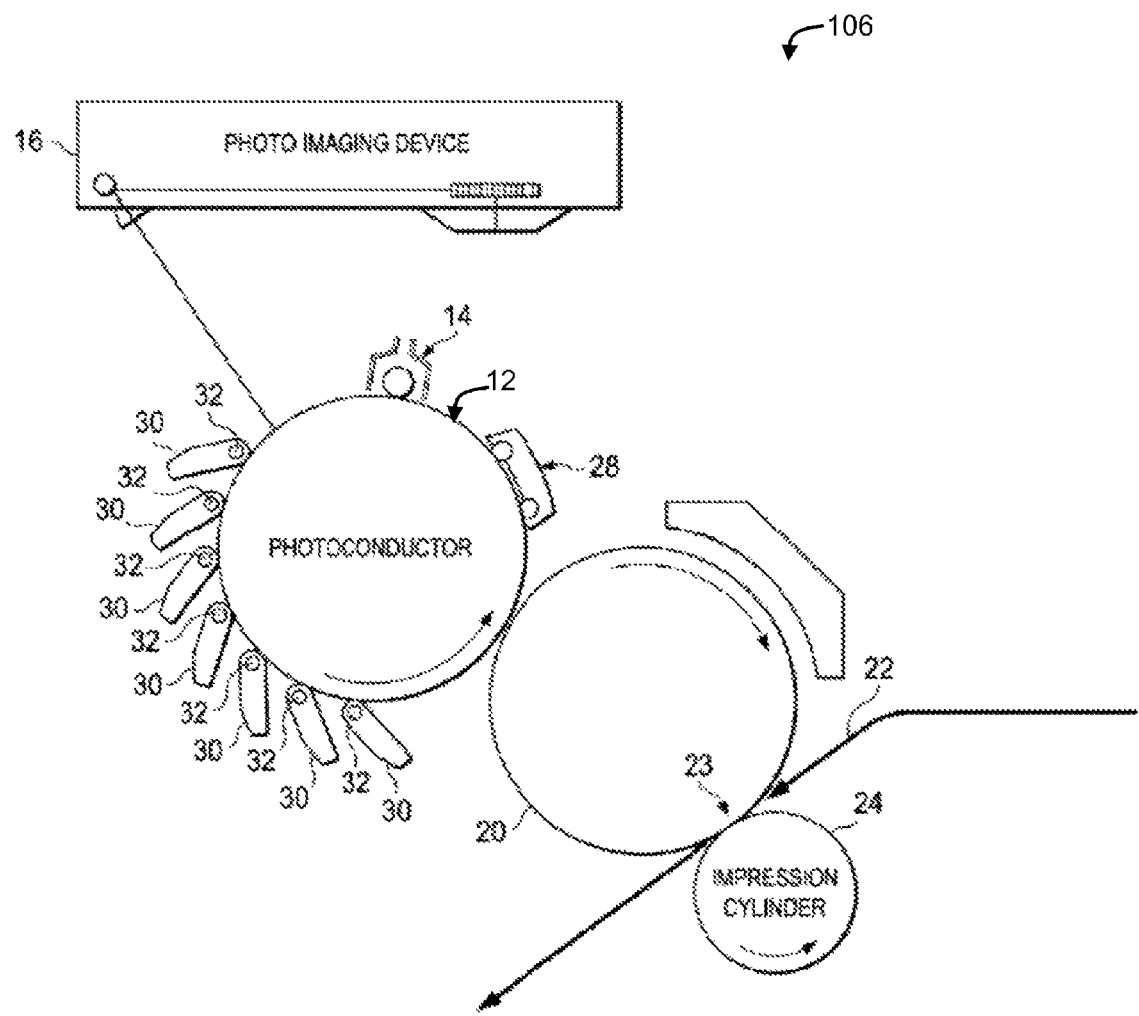
FIG. 2 shows a printing device usable to print in accordance with various examples.

As shown in FIG. 2, the printing device 106 includes a photoconductor 12, a charging device 14, a photo imaging device 16, an intermediate transfer member 20, and an impression cylinder 24. One or more binary ink developer (BID) assemblies 30 are also provided adjacent the photoconductor 12. The example of FIG. 2 includes multiple BIDs 30, one for each color including, for example, cyan, magenta, yellow, and black as well as other colors as desired such as orange, green, violet, white, light cyan, and light magenta. The number of different colors and the particular colors can be varied as desired. The examples described below assume only cyan, magenta, yellow and black inks are used by the printing device 106 to print a document (e.g., document 110 in FIG. 1).

In the printing device 106, a uniform electrostatic charge may be applied to the outer surface of the photoconductor 12 by the charging device 14. The photoconductor 12 used for liquid electro photography (LEP) printing is referred to as a photo imaging plate (PIP). A photo imaging device 16 (e.g., a laser) exposes selected areas on photoconductor 12 in the pattern of the desired printed image to dissipate the charge on the areas of photoconductor 12 exposed to the laser. In discharge area development (DAD), for example, the discharged areas on photoconductor 12 form an electrostatic image which corresponds to the image to be printed. This electrostatic image is a "latent" image because it has not yet been developed into a toner image. A thin layer of liquid toner for one of the inks in a BID assembly 30 is applied to the patterned photoconductor 12. Each BID assembly 30 includes a developer roller 32 that supplies ink to the photoconductor 12 as the developer roller 32 rotates against the photoconductor 12.

The latent image on photoconductor 12 is developed through the application of liquid toner from the developer rollers 32. The liquid toner adheres to the discharged areas of photoconductor 12 in a uniform layer of toner on photoconductor 12, thereby developing the latent electrostatic image into a toner image. The toner image is transferred from photoconductor 12 to the intermediate transfer member 20 and then from the intermediate transfer member 20 to print medium 22 as the print medium passes through a nip 23 between intermediate transfer member 20 and the impression cylinder 24. A cleaning station 28 removes toner residue in preparation for developing the next image or for applying the next toner color plane.

One BID 30 (and thus one developer roller 32) at a time is used to form a pattern on the print media. If only black ink is used for a given page, then only the black ink developer roller 32 is used. If a page with color is to be printed, the above-described process is repeated for each color developer roller used to print the given page. Multiple sequential passes (sometimes referred to as "clicks") over the same page are made with the various colors for that page.

Referring again to FIG. 1, for each ink color (including black), a "separation" is computed by the RIP 104, a process also referred to as rasterization. A separation is a pixel pattern for that particular color to be imprinted on the print medium. Each separation is computed by the RIP 104 based on a configuration programmed into the RIP 104 by the host processor 102. A given RIP configuration includes, for example, an output International Color Consortium (ICC) profile and may include other parameters and values as well. FIG. 1, shows various RIP configurations 116 stored in the storage device 108. The host processor 102 determines, for each page in a document 110, whether that page contains color. As noted above, "color" means a color other than black. If the page is determined to contain color, the host processor 102 configures the RIP 104 to use a configuration suitable for color printing. If the page is determined not to contain color, the host processor 102 configures the RIP to use a configuration suitable for printing with black ink only (for printing black and shades of gray).

Figure 3:
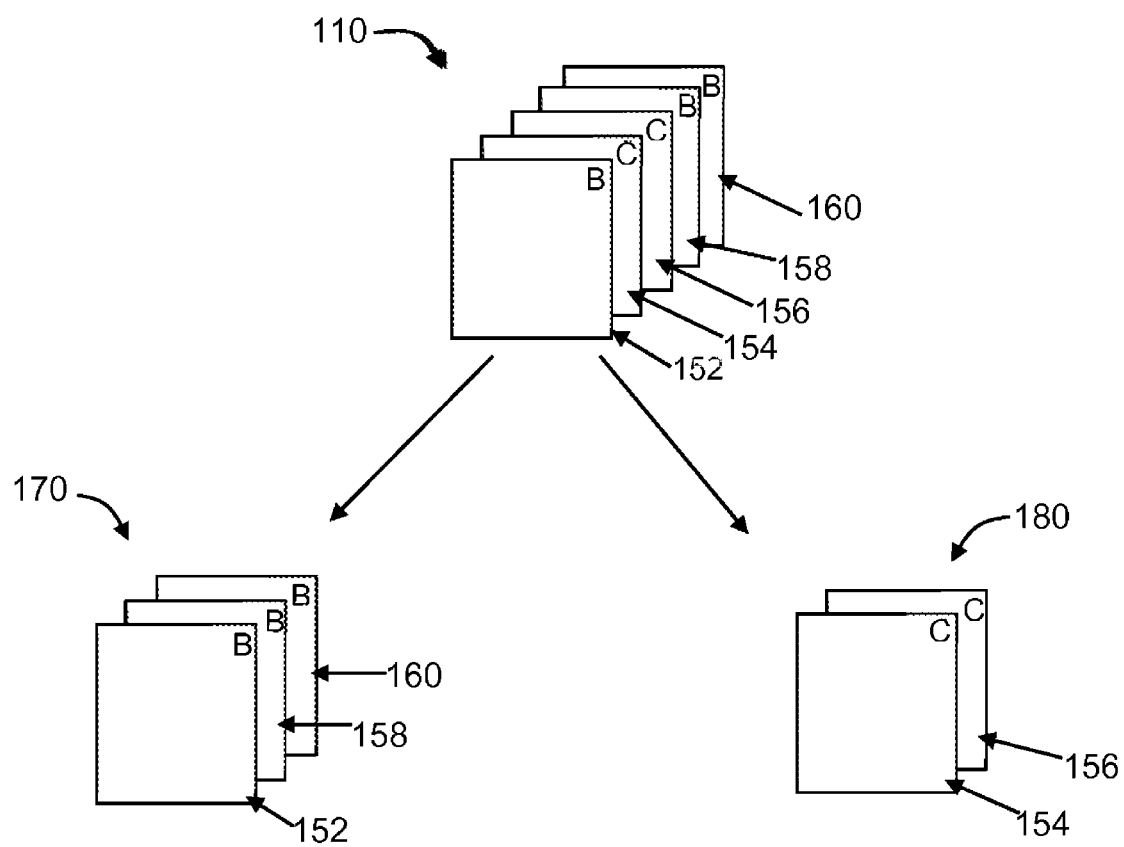
FIG. 3 illustrates a print job partitioned into multiple print sub-jobs in accordance with various examples.

FIG. 3 illustrates the document 110 from FIG. 1. Document 110 is a multi-page document to be printed on printing device 106. The illustrative document contains five pages designated as pages 152, 154, 156, 158, and 160. Pages 152, 158 and 160 contain no color (indicated by the letter "B" for black ink in the corner of each page). Pages 154 and 156 do contain color as indicated by the letter "C" for color in the corner of those pages. The letters B and C are only for ease of understanding the disclosed examples and are not actually part of the document itself.

Using techniques, such as those described below, the host processor 102 analyzes rendering information pertaining to each page of document 110 to determine whether or not each such page contains color. The host processor then partitions the print job into multiple print sub-jobs. Partitioning into two print sub-jobs is discussed below, but as noted above, the number of print sub-jobs can be more than two. For example, the host processor 102 partitions the print job into two print sub-jobs 170 and 180. Print sub-job 170 in this example contains pages 152, 158, and 160 printable with only black ink only, and print sub-job 180 contains pages 154 and 156 requiring color inks to be used for printing those pages.

An example of a process by which the host processor 102 determines whether a given page of a document contains color will now be explained. Any of a variety of techniques can be used and largely depend on the particular document at hand and the format of the contents of the document. In some embodiments, the document to be processed is any type of Page Description Language (PDL) document such as Portable Document Format (PDF), PostScript, or other such document types. PDL documents generally contain rendering information and instructions associated with each page. A PDL is a language that describes the appearance of a printed page in a higher level than an actual output bitmap. A PDL may specify the arrangement of a printed page through commands from a computer that the printer carries out. Some PDLs may describe page elements as geometrical objects (e.g., lines, arcs, etc.).

PDLs include information about one or more "color spaces" for each page or for each object on the page. A color space is a color system that a PDL uses to specify abstract colors in a printer-dependent or printer-independent manner. A color space has a name that is embedded in the document itself. To determine whether a given page in the document includes color or is a black only, the host processor 102 searches each page in the document for color space names. Upon encountering a color space name associated with a given page that indicates that some or the entire page is to be printed in color, the host processor 102 designates that particular page as a color page (e.g., page 154 or 156 in the example of FIG. 3). If the host processor 102 completes a search of a page without finding any information (e.g., color space name) indicative of color, the host processor designates the page has black ink only (e.g., pages 152, 158 and 160 in FIG. 3).

Some implementations are based on the assumption that a page uses all color spaces defined for that page. That is, if a color space has been defined for a given page, it is assumed that that color space is actually used to print the given page. Thus, if, upon searching the color spaces for a given page, a page is encountered that indicates color is to be used, then the searching process terminates for that page and the page is designated as a color page because at least part of the page is to be printed with color. If, upon searching the entire page, no color spaces indicative of color are encountered, then the page is designated as a non-color page (i.e., a grey page printable with black ink only). The process repeats for every page in the document.

A commonly used PDL is PDF and the following illustrative discussion explains how a PDF document can be analyzed to determine whether each page has color. This disclosure, of course, is not limited to PDF documents as noted above. A PDF document includes one or more objects on each page. Any given object may have a color space type associated with it. Examples of color space types used in PDF-compliant documents include /DeviceGray, /DeviceRGB, /DeviceCMYK, /Pattern, /CalRGB, /CalGray, /Lab, /ICC-Based, /Separation, /Indexed, and /DeviceN.

If the color space type of any object on a page is /DeviceCMYK, /DeviceRGB, /CalRGB, or /Lab, then the host processor 102 determines the page to contain color.

If the color space type is /ICCBased, then another element (e.g., the second element) in an array corresponding to that color space is a stream with an attributes dictionary. That dictionary includes a symbol referred to as "N" which points to a number that represents the number of colorants in the color space. In some embodiments, if the number N is greater than 1, the host processor 102 determines the page to contain color. Otherwise, if the number N is equal to 1, then the host processor 102 determines any objects on the page using this color space not to contain color.

If the color space type is /Separation, then another element (e.g., the second element) in an array corresponding to that color space is a separation name. If the separation name is anything other than "Black," "All," or "None," then the host processor 102 determines the page to contain color. Otherwise, the host processor 102 determines any objects on the page using this color space not to contain color.

If the color space type is /DeviceN, then an element (e.g., the second element) in an array corresponding to that color space is yet another array containing separation names. If a separation name exists in that array other than "Black" or "None," then the host processor 102 determines the page to contain color. Otherwise, the host processor 102 determines any objects on the page using this color space not to contain color.

If the color space type is /Indexed, then an element (e.g., the second element) in an array corresponding to that color space is another color space specification that represents the actual color space that is being indexed. The indexed color space is searched by the host processor 102 the same as any other color space specification, such as that described above.

For the host processor 102 to find the device color space types such as those noted above (e.g., /DeviceCMYK, /DeviceRGB, and /DeviceGray), the host processor may search the content streams which are in the "Contents" attribute in the page dictionary. A content stream contains a sequence of instructions describing the graphical elements to be rendered (e.g., printed) on a page. Each page in a PDF document is represented by one or more content streams. Each content stream may have one or more sets of operands and operators.

An operator specifies an action to be performed (e.g., painting a graphical shape on the page). An operand is associated with a corresponding operator and is the object of the action specified by the operator. An operand may be preceded by a slash character (/). The color space types illustrated above (e.g., DeviceCMYK) can be operands for color space operators. An operator is one of many recognized operators defined in the PDF standard. The operators "CS" and "cs" set the color space. The operator CS sets the stroking color space and the operator cs sets the nonstroking color space. Preceding the CS and cs operators is a color space type, or the key for a color space in the ColorSpace subdictionary of the current Resource dictionary. An example is:

/DeviceCMYK cs which sets /DeviceCMYK as the nonstroking color space.

The host processor 102 thus searches the content streams for CS and cs operators. The operators are surrounded on opposing sides by "white space" characters (e.g., spaces, tabs, carriage return, line feed). The host processor searches for the character string CS or cs between a pair of white space characters. Including the white space characters in the searching process helps the host processor 102 to differentiate color space operators from non-operator text strings that happen to contain the letters CS or cs. In the PDF standard, stings are delimited by open and close parentheses—"("and")". Accordingly, the characters CS and cs should be ignored if they fall within a string. If the operand preceding a CS or cs operator is /DeviceCMYK or /DeviceRGB, then the host processor determines the page to contain color.

Some PDF documents use an operator that sets the color space and sets color values in one command. For example, the operators "RG" and "rg" set the color space to DeviceRGB. The operators "K" and "k" set the color space to DeviceCMYK. If any of these operators (RG, rg, K, k) are found for a page of document, the host processor 102 designates the page to contain color.

The Resources dictionary for a particular page of a PDF document may contain various keys indicative of the color content of the page. Such keys (also called subdictionaries) may include "ColorSpace," "XObject," "Pattern," and "Shading." Each of these subdictionaries may contain color space definitions that the host processor 102 examines to separate color pages from black ink only pages as described above.

The ColorSpace subdictionary is a dictionary of color space names which point to a color space object. The color space object may be referenced directly or indirectly. The color space object is either a name or an array as described above.

The XObject subdictionary is a dictionary of XObject names. Each XObject name points to a stream describing the XObject. If the attributes dictionary of the stream contains a Resources entry, then the host processor 102 searches the entry as any Resources dictionary. The Resources dictionary for a page is described above. This resource dictionary may be searched for color spaces. A Resources dictionary for an XObject may also contain the same types of sub-dictionaries and is searched in the same way. XObject sub-dictionaries may also be present and such sub-dictionaries are also searched. If the attributes dictionary contains a ColorSpace entry, this entry directly or indirectly points to a color space description which may be a name or an array as described above.

In some implementations, as soon as one object or color space is found that indicates the presence of color on the page, that page can stop being searched because the page is already known to contain color.

The Pattern subdictionary is a dictionary of pattern names. Each pattern name points either to a dictionary or a stream with an attributes dictionary, depending on the type of pattern. Either way, if the identified dictionary has a Resources entry, then the host processor 102 searches the entry as any Resources dictionary. If the Pattern subdictionary contains a Shading entry, that entry will point directly or indirectly to either a dictionary or a stream with an attributes dictionary. If the Pattern subdictionary contains a ColorSpace entry, the entry points directly or indirectly to a color space description which can be a name or an array as described above.

The Shading subdictionary is a dictionary of Shading names. Each name points to either a dictionary or a stream with an attributes dictionary. If the identified dictionary contains a ColorSpace entry, this entry points directly or indirectly to a color space description which can be a name or an array as described above.

Figure 4:
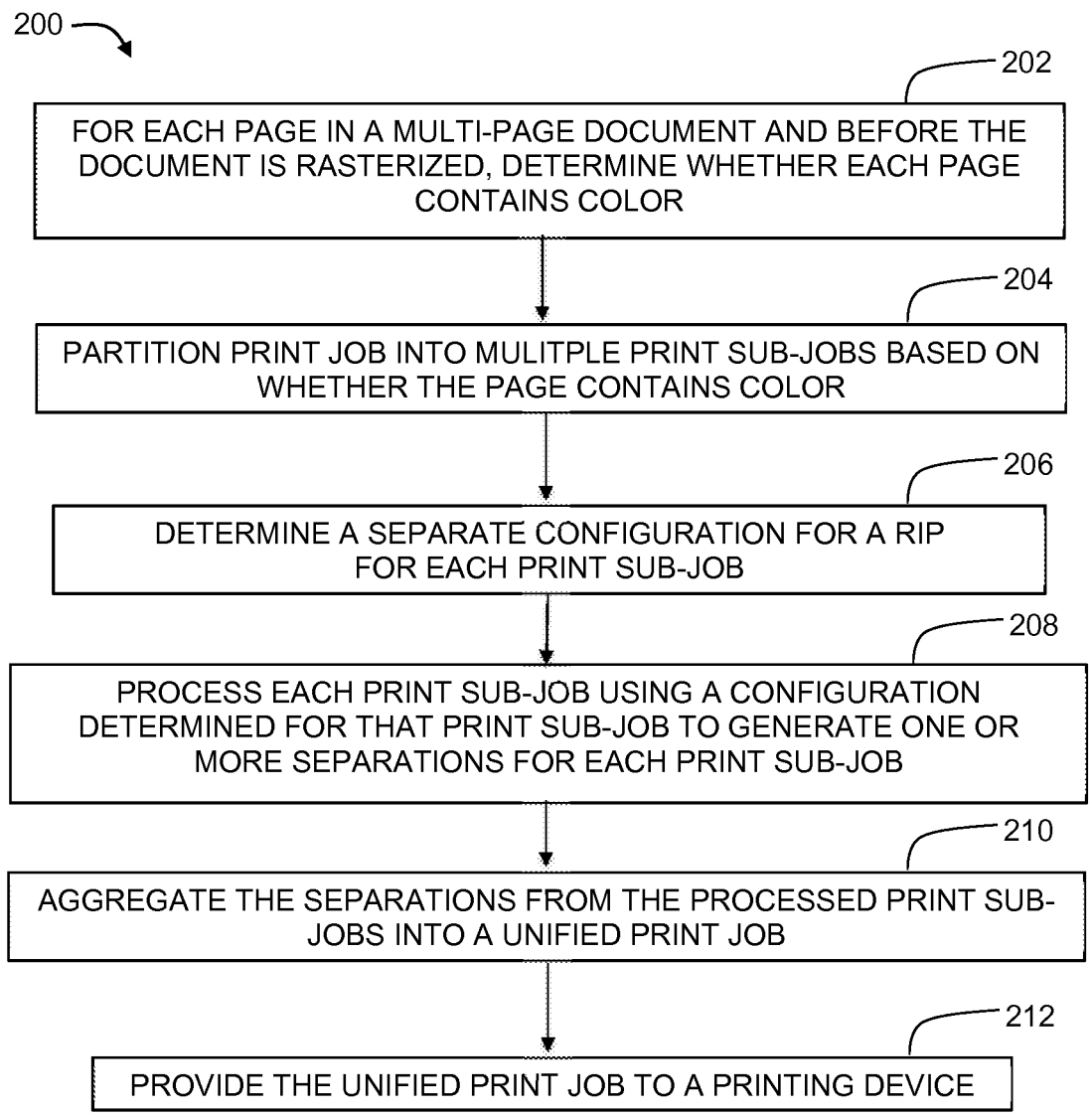
FIG. 4 shows a method in accordance with various examples.

FIG. 4 illustrates a method 200 in accordance with various embodiments. The various actions shown can be performed in the order shown or in a different order. Further, two or more of the actions may be performed in parallel rather than sequentially.

At 202, the method comprises determining, for each page in a multi-page document (e.g., a PDL document such as a PDF document) of a print job and before the document is rasterized by the RIP 104, whether each such page contains color. This action may be performed by the host processor 102 searching and analyzing the contents of the PDL document for color space information associated with each page. Examples of how the host processor 102 searches the document are provided above.

At 204, the host processor 102 partitions the print job into a plurality of print sub-jobs based on whether the pages contain color. The print sub-jobs may contain, for example, a first print sub-job of pages for black ink only printing and a second print sub-job of pages for printing with a non-black ink (e.g., cyan, magenta, and yellow inks or other color inks). The host processor 102 may perform this action by saving the pages of each print sub-job to the storage device 108.

At 206, the host processor 102 determines a separate configuration for the RIP 104 for each print sub-job. The host processor may have access to a variety of RIP configurations 116 in storage device 108 for the various types of print jobs (e.g., black ink only printing, color printing, etc.). The host processor selects the appropriate configuration 116 for each print sub-job.

At 208, the method comprises the RIP 104 processing each print sub-job using the configuration determined for that print sub-job by the host processor 102 to generate a separation for each such print sub-job. The host processor 102 provides each print sub-job to RIP 104 along with the configuration 116 associated with that print sub-job. The RIP 104 processes each print sub-job by, for example, rasterizing the print sub-job to generate a specific pixel pattern for each ink to be used to print each page of the sub-job. In various embodiments, each separation is used with a specific developer roller 32 as explained above. If a particular page is to be printed with black ink only, then the RIP 104 generates a single separation for the black ink used for printing that page. If, however, a page is to be printed with various colors (e.g., cyan, magenta, yellow, black, etc.), then the RIP generates a separation for each such color ink for the given page.

In some implementations, a single RIP 104 is used to generate the various separations. The host processor 102 programs the RIP 104 for one configuration and requests the RIP to process a print sub-job to which that configuration pertains. The host processor 102 then reprograms the RIP 104 for another configuration and then requests the RIP to process a different print sub-job to which this new configuration pertains. This process sequentially repeats until the RIP 104 has processed all print sub-jobs.

In other implementations, system 100 includes multiple RIPs 104 capable, for example, of operating in parallel. As such, the host processor 102 may program multiple RIPs 104 with different configurations and request each such RIP to process a separate print sub-job in parallel.

At 210, the method further includes aggregating the separations from the processing performed by the RIP 104 into a unified print job. The various separations are assembled in page order to form the unified print job.

At 212, the unified print job is provided by the host processor 102 to the printing device 106. The printing device 106 thus prints the pages of the document in order.

In some implementations, the host processor 102 determines whether color is present on a page using only the color spaces found on the page and if so, designates that page as color to subsequently be rasterized by a RIP configured appropriately for color printing. In other implementations, the host processor 102 may go one step further and determines whether the actual colors specified in the color space represent non-gray colors. The host processor 102 may determine whether a given color within a color space has equal amounts of three colorants and, if so, designates the color to be gray. For example, if the only color values actually used have R=G=B (red, green, and blue in equal values), then the color is deemed to be gray. Similarly, if a CMYK color space only uses non-zero values for the black channel, then the specified color is considered to be gray. The search for color continues on the page and if no color is found on the page, the page considered to be gray. In such situations, the page can be printed with black ink only instead of a non-black ink. The host processor 102 includes such pages in a print sub-job containing other pages determined not to include color.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a host processor; and
   a raster image processor (RIP);
   wherein the host processor is to:
      determine whether each page in a multi-page print job contains color, the pages of the print job having a predetermined order;
      partition the print job into a plurality of print sub-jobs based on the determination as to whether each page has color, the print sub-jobs comprising a first print sub-job containing only pages that include color and a second print sub-job containing only pages that do not contain color;
      determine a separate configuration for the RIP for each print sub-job;
      for the first print sub-job, cause the RIP to compute a plurality of separations for each page in accordance with the configuration determined for the first print sub-job;
      for the second print sub-job, cause the RIP to compute a single separation for each page in accordance with the configuration determined for the second print sub-job; and
      after computing the separations, aggregate the separations into an order such that the pages of the print job will be printed by a printer in the predetermined order.

2. The system of claim 1 wherein the host processor determines whether each page in the document contains color by searching the document for color space identifiers.

3. The system of claim 2 wherein the host processor determines a given page to contain color if that page has a color space name that is at least one of DeviceCMYK, DeviceRGB, CalRGB, and Lab.

4. The system of claim 2 wherein the host processor determines a page of the document not to contain color based on the page not containing any color spaces indicative of color for that page.

5. The system of claim 2 wherein the host processor determines a page of the document to contain color based on the color space identifier being ICCBased and a value in a corresponding attributes dictionary that defines a number of colorants in the color space to be greater than 1.

6. The system of claim 1 wherein the host processor determines whether a given color within a color space has equal amounts of three colorants and, if so, designates the color to be gray.

7. A method, comprising:
   for each page in a multi-page print job and before the print job is rasterized, determining whether each such page contains color;
   partitioning the print job into a plurality of print sub-jobs based on whether the pages contain color, a first print sub-job of pages for black ink only printing and a second print sub-job of pages for printing with a non-black ink;
   determining a separate configuration for a raster image processor (RIP) for each print sub-job;
   processing, by the RIP, each print sub-job using a configuration determined for that print sub-job to generate a separation for each print sub-job;
   aggregating the separations from the processed print sub-jobs into a unified print job such that the unified print job has the same order of pages as in the multi-page print job before partitioning; and
   providing the unified print job to a printing device.

8. The method of claim 7 wherein processing each sub-job comprises rasterizing each print sub-job.

9. The method of claim 7 wherein determining whether each page contains color comprises searching each page for a color space identifier.

10. The method of claim 9 further comprising determining a given page to contain color when the color space identifier is indicative of color.

11. The method of claim 9 further comprising determining a given page to contain color when the color space identifier is at least one of DeviceCMYK, DeviceRGB, CalRGB, and Lab.

12. The method of claim 9 further comprising determining a page not to contain color based on the page not containing any color spaces indicative of color for that page.

13. The method of claim 9 further comprising determining a page to contain color based on the color space identifier being ICCBased and a value in a corresponding attributes dictionary that defines a number of colorants in the color space to be greater than 1.

14. The method of claim 9 further comprising determining a page to contain color based on the color space identifier being Separation, and separation name in a corresponding array is none of "black," "all," or "none."

15. The method of claim 9 further comprising determining a page of the document to contain color based on the color space identifier being DeviceN and at least one separation name in a corresponding array not being "black" or "none."

16. The method of claim 7 determining whether each page contains color comprises searching for a predefined operator with at least one of a space, a tab, a carriage return, and a line feed on immediately opposite sides of the operator character string.

17. A non-transitory storage device containing software that, when executed by a host processor, causes the host processor to:

determine whether each page in a multi-page document contains color, the pages of the print job having a predetermined order;

partition a print job into a plurality of print sub-jobs based on the determination as to whether each page has color, the print sub-jobs comprising a first print sub-job containing only pages that include color and a second print sub-job containing only pages that do not include color;

determine a separate configuration for a raster image processor (RIP) for each print sub-job;

for the first print sub-job, cause the RIP to compute a plurality of separations for each page in accordance with the configuration determined for the first print sub-job;

for the second print sub-job, cause the RIP to compute a single separation for each page in accordance with the configuration determined for the second print sub-job; and after computing the separations, aggregate the separations into an order such that the pages of the print job will be printed by a printer in the predetermined order.

18. The non-transitory storage device of claim 17 wherein the software causes the host processor to determine whether each page in the document contains color by causing the host processor to search the document for color space names.

* * * * *